(12) United States Patent
Cao

(10) Patent No.: US 10,503,325 B2
(45) Date of Patent: Dec. 10, 2019

(54) DISPLAY DEVICE, TOUCH PANEL AND METHOD FOR MANUFACTURING THE SAME

(71) Applicants: BOE Technology Group Co., Ltd., Beijing (CN); Hefei Xinsheng Optoelectronics Technology Co., Ltd., Anhui (CN)

(72) Inventor: Binbin Cao, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 0 days.

(21) Appl. No.: 15/143,673

(22) Filed: May 2, 2016

(65) Prior Publication Data

US 2017/0052615 A1 Feb. 23, 2017

(30) Foreign Application Priority Data

Aug. 20, 2015 (CN) .......................... 2015 1 0516320

(51) Int. Cl.
*G06F 3/044* (2006.01)

(52) U.S. Cl.
CPC .... *G06F 3/044* (2013.01); *G06F 2203/04103* (2013.01); *G06F 2203/04111* (2013.01)

(58) Field of Classification Search
CPC .............................. G06F 3/044; G06F 3/0412
USPC ..................................... 345/173, 174; 349/12
See application file for complete search history.

(56) References Cited

U.S. PATENT DOCUMENTS

| 9,417,745 | B2 | 8/2016 | Hao et al. | |
|---|---|---|---|---|
| 9,626,017 | B2 | 4/2017 | Wang | |
| 2010/0182275 | A1* | 7/2010 | Saitou | G06F 3/044 345/174 |
| 2011/0134055 | A1* | 6/2011 | Jung | G06F 3/044 345/173 |

(Continued)

FOREIGN PATENT DOCUMENTS

| CN | 102880340 A | 1/2013 |
|---|---|---|
| CN | 103235659 A | 8/2013 |

(Continued)

OTHER PUBLICATIONS

Office Action from Chinese Patent Application No. 201510516320.7, dated Aug. 10, 2017, 8 pages.

*Primary Examiner* — Abdul-Samad A Adediran
(74) *Attorney, Agent, or Firm* — Westman, Champlin & Koehler, P.A.

(57) ABSTRACT

The present disclosure relates to a display device, a touch panel and a method for manufacturing the touch panel. The method includes: forming a patterned metal lead and a patterned metal bridge on a substrate through one patterning process; depositing an insulation layer and a transparent electrode layer, and forming a pattern of the insulation layer and patterns of a first electrode and a second electrode for touching through one patterning process. In the method, patterns of the insulation layer, the first electrode and the second electrode can be formed simultaneously through one patterning process, thereby increasing efficiency of manufacturing the touch panel at the extreme, saving manufacturing cost and increasing competitiveness of production line.

8 Claims, 5 Drawing Sheets

(56) References Cited

U.S. PATENT DOCUMENTS

| | | | | |
|---|---|---|---|---|
| 2011/0193801 A1* | 8/2011 | Jung | .................... | G06F 3/0412 |
| | | | | 345/173 |
| 2014/0071064 A1* | 3/2014 | Cho | ........................ | G06F 3/044 |
| | | | | 345/173 |
| 2015/0103266 A1* | 4/2015 | Hao | ........................ | G06F 3/044 |
| | | | | 349/12 |
| 2015/0145787 A1 | 5/2015 | Wang | | |
| 2015/0338953 A1* | 11/2015 | Liu | ........................ | G06F 3/044 |
| | | | | 345/174 |
| 2016/0306450 A1 | 10/2016 | Chen | | |

FOREIGN PATENT DOCUMENTS

| | | |
|---|---|---|
| CN | 103500036 A | 1/2014 |
| CN | 104199580 A | 12/2014 |
| CN | 104699308 A | 6/2015 |

\* cited by examiner

DISPLAY DEVICE, TOUCH PANEL AND METHOD FOR MANUFACTURING THE SAME

CROSS-REFERENCE TO RELATED APPLICATION

This application claims the benefit of Chinese Patent Application No. 201510516320.7 filed on Aug. 20, 2015 in the State Intellectual Property Office of China, the whole disclosure of which is incorporated herein by reference.

BACKGROUND OF THE INVENTION

Field of the Invention

Embodiments of the present disclosure relate to a field of display technology, in particular, to a display device, a touch panel and a method for manufacturing the touch panel.

Description of the Related Art

Currently, with a rapid development of touch technology, one-glass-solution (OGS) capacitive touch screen technology has gradually become a development trend of touch panel due to its advantages such as simple structure, light and thin property, good light transmission, etc. Further, as one piece of glass substrate and one lamination process may be omitted, there is also an advantage such as high product yield for the OGS capacitive touch screen, so that the OGS capacitive touch screen has a broad market prospect in the touch screen field.

In an existing production line, it is required to employ a plurality of patterning processes through masks for the OGS capacitive touch screen in order to manufacture an insulation layer and touch electrodes, which leads to some defects, such as low manufacturing efficiency and high manufacturing cost, during manufacturing the OGS capacitive touch screen.

SUMMARY OF THE INVENTION

The present disclosure aims to provide a display device, a touch panel and a method for manufacturing the touch panel so as to address the above defects, such as low manufacturing efficiency and high manufacturing cost, caused by the plurality of patterning processes through masks required during manufacturing the OGS capacitive touch screen in the prior art.

In order to solve the above defects, embodiments of the present disclosure provide a method for manufacturing a touch panel, comprising:

step S1: forming a patterned metal lead and a patterned metal bridge on a substrate through one patterning process;

step S2: depositing an insulation layer and a transparent electrode layer and forming a pattern of the insulation layer and patterns of a first electrode and a second electrode for touching through one patterning process.

Preferably, the method may further comprise: before the step S1, forming a pattern of a black matrix, which corresponds to the metal lead, on the substrate.

Preferably, the step S2 may specifically comprise:

coating photoresist on the insulation layer, exposing and developing the photoresist through a semitransparent mask, wherein the semitransparent mask comprises a fully-exposing region, a partially-exposing region and a non-exposing region, a region of the photoresist corresponding to a via hole of the insulation layer is a photoresist fully-exposed region, a region of the photoresist corresponding to the first and second electrodes is a photoresist partially-exposed region, a region of the photoresist excluding the photoresist fully-exposed region and the photoresist partially-exposed region is a photoresist fully-reserved region, the fully-exposing region, the partially-exposing region and the non-exposing region of the semitransparent mask correspond to the photoresist fully-exposed region, the photoresist partially-exposed region and the photoresist fully-reserved region, respectively;

dry etching the insulation layer to form the via hole of the insulation layer, and ashing the photoresist to remove the photoresist in the photoresist partially-exposed region;

depositing a transparent electrode layer and peeling off the remained photoresist, so that the transparent electrode layer in a region where the photoresist is remained is fully removed and the transparent electrode layer in a region where there is no photoresist is fully reserved so as to form the first electrode and the second electrode for touching.

Preferably, the method may further comprise a step S3 of forming a protective layer on the first and second electrodes after the step S2.

Preferably, the protective layer may be formed of $SiNO_x$ film.

According to certain embodiments of the present disclosure, it is provided a touch panel comprising: a substrate; a metal lead and a metal bridge disposed on the substrate; an insulation layer, a first electrode and a second electrode for touching disposed on the substrate on which the metal lead and the metal bridge have been formed; via holes formed in the insulation layer, wherein the first electrode is electrically connected with the metal lead and the metal bridge through the via holes, respectively.

Preferably, the touch panel may further comprise a black matrix disposed on the substrate, the black matrix being in close contact with the substrate and corresponding to a position of the metal lead.

Preferably, the touch panel may further comprise a protective layer located on the first and second electrodes.

According to certain embodiments of the present disclosure, it is further provided a display device comprising the touch panel of any one of the above embodiments.

The present disclosure provides a display device, a touch panel and a method for manufacturing the touch panel. In the method, patterns of the insulation layer, the first electrode and the second electrode can be formed simultaneously through one patterning process, thereby increasing efficiency of manufacturing the touch panel at the extreme, saving manufacturing cost and increasing competitiveness of production line.

1: substrate; 2: black matrix; 3: metal lead; 4: metal bridge; 5: insulation layer; 51: via hole; 6: photoresist; 7: transparent electrode layer; 81: first electrode; 82: second electrode; 9: protective layer.

DETAILED DESCRIPTION OF PREFERRED
EMBODIMENTS OF THE INVENTION

Specific implementations of the present disclosure will be further described in detail hereinafter in conjunction with embodiments and drawings. The following embodiments are used to explain the present disclosure, rather than to limit the scope of the present disclosure.

Figure 1:
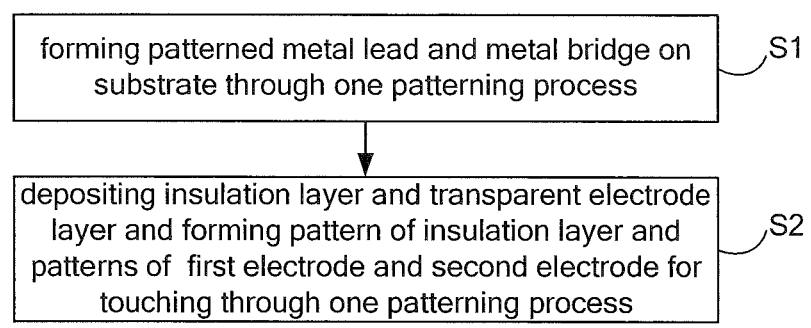
FIG. 1 is a flow chart of a method for manufacturing a touch panel according to certain embodiments of the present disclosure.

FIG. 1 is a flow chart of a method for manufacturing a touch panel according to certain embodiments of the present disclosure. As shown in FIG. 1, the method may be applied to manufacture an on-cell touch panel. The method may comprise:

a step S101: forming a patterned metal lead and a patterned metal bridge on a substrate through one patterning process;

a step S201: depositing an insulation layer and a transparent electrode layer and forming a pattern of the insulation layer and patterns of a first electrode and a second electrode for touching through one patterning process.

Further, the method may comprise a step of forming a protective layer on the first and second electrodes. The protective layer may be formed of $SiNO_x$ film. The protective layer enables ITO to be invisible and functions to protect the first and second electrodes from contamination and damage by ambient environment.

In the method, patterns of the insulation layer, the first electrode and the second electrode can be formed through one patterning process, thereby greatly increasing efficiency of manufacturing the touch panel, saving manufacturing cost and increasing competitiveness of production line.

Figure 2A:
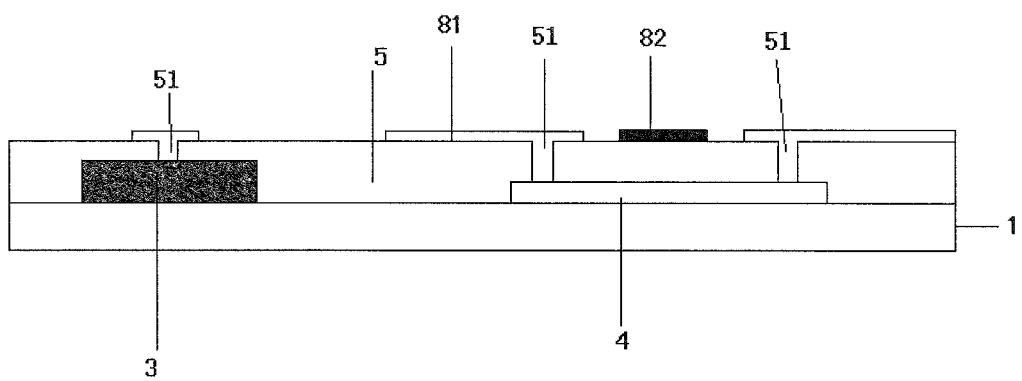
FIG. 2(a) is a schematic structural view of a touch panel manufactured by the method of FIG. 1.

FIG. 2(a) shows a structure of the on-cell touch panel manufactured by the method of FIG. 1. As shown in FIG. 2, the touch panel comprises: a substrate 1; a metal lead 3 and a metal bridge 4 disposed on the substrate 1; an insulation layer 5, a first electrode 81 and a second electrode 82 for touching disposed on the substrate formed with the metal lead 3 and the metal bridge 4; via holes 51 formed in the insulation layer 5, wherein the first electrode 81 is electrically connected with the metal lead 3 and the metal bridge 4 through the via holes 51, respectively.

Figure 2B:
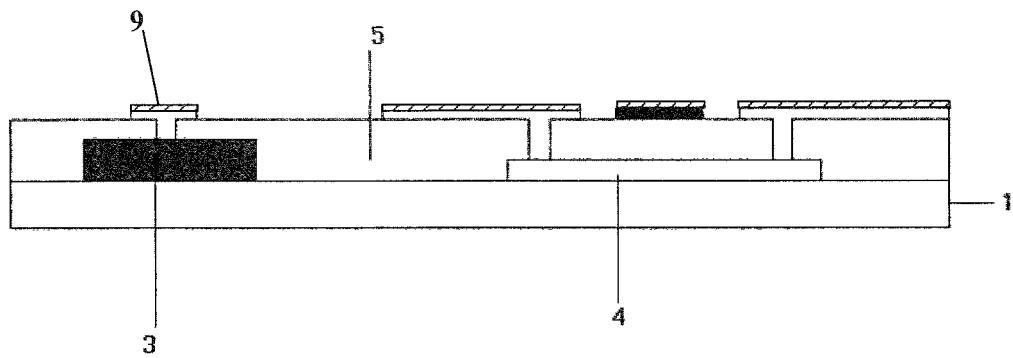
FIG. 2(b) is a schematic structural view of the touch panel of FIG. 2 showing a protective layer.

Further, as shown in FIG. 2(b), the touch panel may further comprise a protective layer 9 located on the first and second electrodes 81, 82 for protecting the patterns of the first and second electrodes 81, 82 from contamination and damage by the ambient environment.

Figure 3:
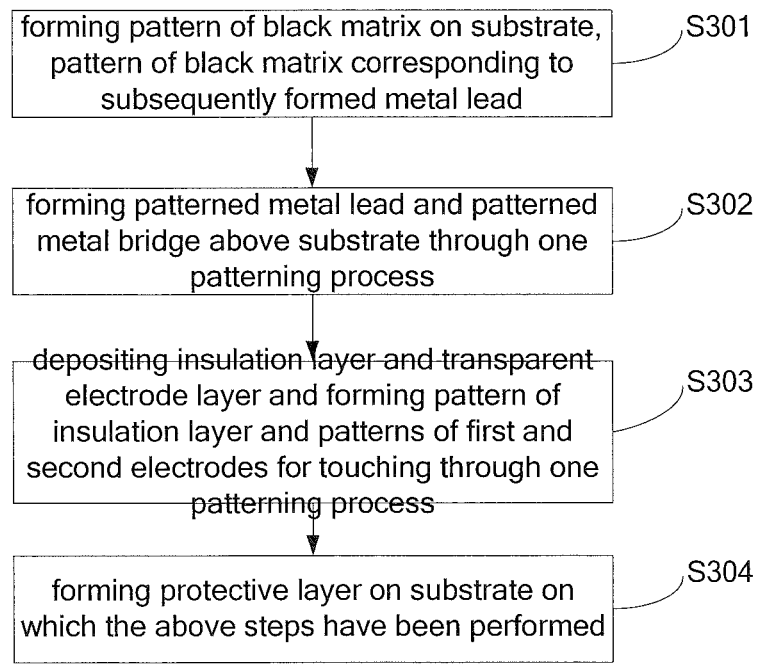
FIG. 3 is a flow chart of a method for manufacturing a touch panel according to certain embodiments of the present disclosure.

Further, FIG. 3 is a flow chart of a method for manufacturing a touch panel according to certain embodiments of the present disclosure, and FIGS. 4-10 are schematic structural views of the touch panel formed in various steps of the method of FIG. 3, respectively. This method may be applied to manufacture an OGS touch panel. Hereinafter, the method for manufacturing the OGS touch panel will be specifically described with reference to FIGS. 3-10. The method may comprise:

a step S301: forming a pattern of black matrix on a substrate, the pattern of black matrix corresponding to a subsequently formed metal lead.

Figure 4:
FIGS. 4-10 are schematic structural views of the touch panel formed in various steps of the method of FIG. 3, respectively.

Specifically, a patterned black matrix 2 is formed on the substrate 1 through a first patterning process. The position of the black matrix 2 corresponds to the position of the metal lead formed in a subsequent step, as shown in FIG. 4. In particular, the patterning process may comprise various known processes, such as coating, exposing, developing, etching, etc.

a step S302: forming a patterned metal lead and a patterned metal bridge on the substrate through one patterning process.

Figure 5:
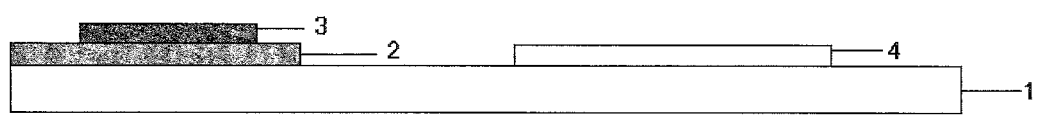

Specifically, a metal layer is deposited and then the patterned metal lead 3 and the patterned metal bridge 4 are formed through a second patterning process, as shown in FIG. 5; wherein the metal lead 3 is located on the black matrix 2.

a step S303: depositing an insulation layer and a transparent electrode layer and forming a pattern of the insulation layer and patterns of a first electrode and a second electrode for touching through one patterning process.

Figure 6:
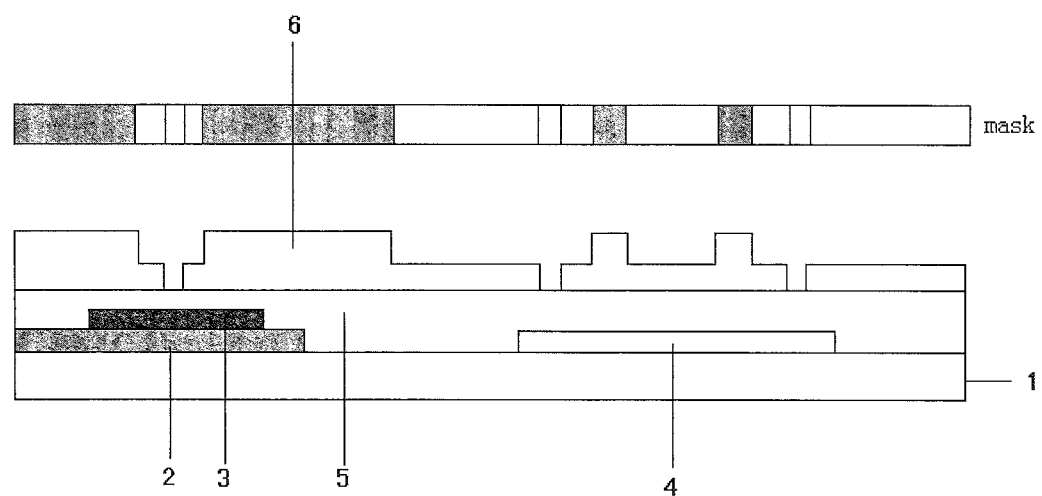
Figure 7:
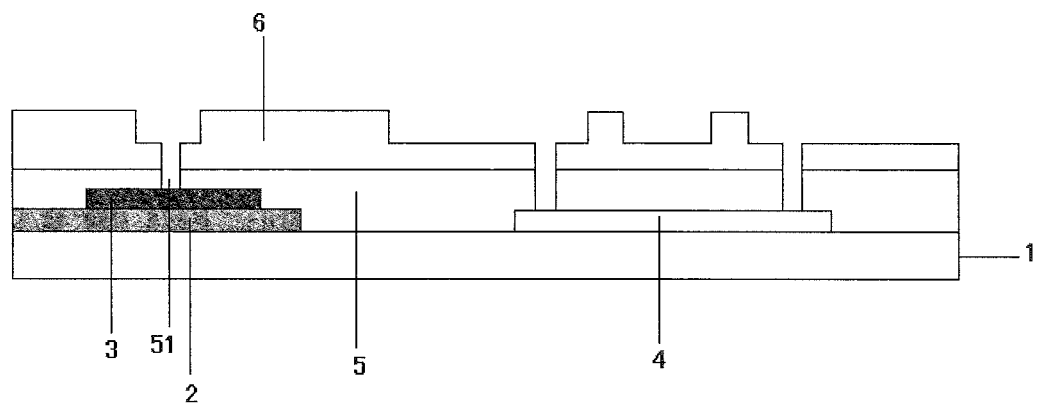
Figure 8:
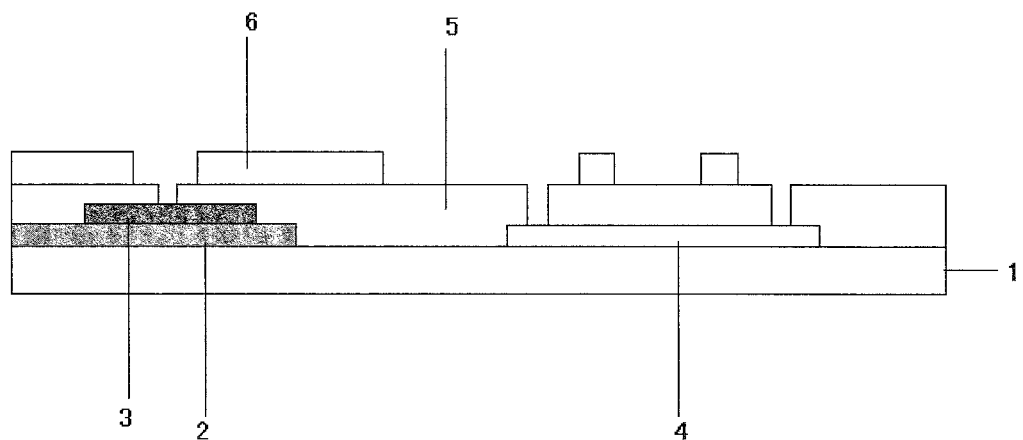
Figure 9:
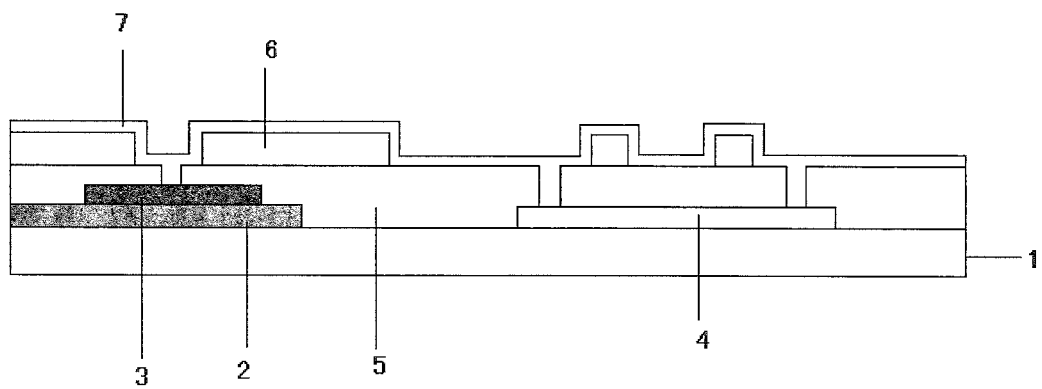
Figure 10:
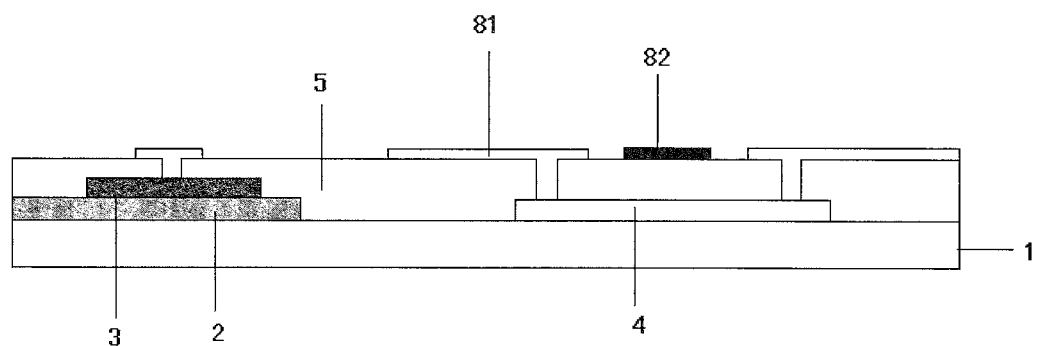

Specifically, the insulation layer 5 and a photoresist 6 are deposited, and the photoresist is exposed and developed through a third patterning process, as shown in FIG. 6. A mask used in this patterning process is a semitransparent mask which comprises a fully-exposing region, a partially-exposing region and a non-exposing region. A region of the photoresist corresponding to a via hole of the insulation layer is a photoresist fully-exposed region, a region of the photoresist corresponding to the first and second electrodes is a photoresist partially-exposed region, a region of the photoresist excluding the photoresist fully-exposed region and the photoresist partially-exposed region is a photoresist fully-reserved region. The fully-exposing region, the partially-exposing region and the non-exposing region of the semitransparent mask correspond to the photoresist fully-exposed region, the photoresist partially-exposed region and the photoresist fully-reserved region, respectively;

then dry etching the insulation layer to form the via hole 51 of the insulation layer as shown in FIG. 7; and ashing the photoresist to remove the photoresist in the photoresist partially-exposed region as shown in FIG. 8;

depositing a transparent electrode layer 7 as shown in FIG. 9; and peeling off the remained photoresist as shown in FIG. 10, so that the transparent electrode layer in a region where the photoresist is remained is fully removed and the transparent electrode layer in a region where there is no photoresist is fully reserved so as to form the first electrode 81 and the second electrode 82 for touching.

In this step, the patterns of the insulation layer, the first and second electrodes may be formed through one patterning process. Thus, only three patterning processes are required to complete the manufacture of the touch panel when the above method is applied to the OGS touch panel.

Further, the method may also comprise:

a step S304: forming a protective layer on the substrate on which the step S303 has been performed.

Specifically, an additional layer of $SiNO_x$ film may be formed on the substrate on which the above steps have been performed, then the $SiNO_x$ film may be processed through an etching and corrosion process so as to form the protective layer.

In this method, patterns of the insulation layer, the first electrode and the second electrode can be formed simultaneously through one patterning process, thereby increasing efficiency of manufacturing the touch panel at the extreme, saving manufacturing cost and increasing competitiveness of production line.

As shown in FIG. 10, the touch panel manufactured by the method according to the embodiments of the present disclosure may comprise: a substrate 1; a black matrix 2 disposed in a position on the substrate 1 corresponding to a metal lead 3; a metal lead 3 and a metal bridge 4 disposed on the substrate 1; an insulation layer 5, a first electrode 81 and a second electrode 82 for touching disposed on the substrate formed with the black matrix 2, the metal lead 3 and the metal bridge 4; via holes 51 formed in the insulation layer 5, wherein the first electrode 81 is electrically connected with the metal lead 3 and the metal bridge 4 through the via holes 51, respectively.

Further, the touch panel may also comprise a protective layer (similar to the protective layer 9 in FIG. 2) located on the first and second electrodes for protecting the patterns of the first and second electrodes from contamination and damage by ambient environment.

Moreover, embodiments of the present disclosure further provide a display device comprising the touch panel according to any one of the above embodiments. The display device may be an electronic device, such as a liquid crystal display, a tablet computer, a cellphone, an e-book, a liquid crystal TV, etc.

The above embodiments are merely preferable implementations of the present disclosure. It should be noted that various modifications and variants may be made by those skilled in the art without departing from the spirit and scope of the present disclosure, and these modifications and variants shall be included in the claimed scope of the present disclosure.

What is claimed is:

1. A method for manufacturing a touch panel, comprising:
    step S1: forming a patterned metal lead and a patterned metal bridge on a substrate through one patterning process by one single first mask;
    step S2: forming a pattern of an insulation layer provided with via holes and patterns of a first electrode and a second electrode for touching through one patterning process by using only one single second mask, for the pattern of the insulation layer provided with the via holes and patterns of the first electrode and second electrode, on the substrate where the patterned metal lead and the patterned metal bridge have been formed, the pattern of the insulation layer being between a combination of the patterned metal lead and the patterned metal bridge and the patterns of the first electrode and the second electrode, and the pattern of the first electrode being electrically connected with the patterned metal bridge and the patterned metal lead though the via holes.

2. The method of claim 1, further comprising: before the step S1, forming a pattern of a black matrix, which corresponds to the metal lead, on the substrate.

3. The method of claim 1, wherein the step S2 comprises:
    depositing the insulation layer on the substrate where the patterned metal lead and the patterned metal bridge have been formed, coating photoresist on the insulation layer, exposing and developing the photoresist through the second mask which is a semitransparent mask, wherein the semitransparent mask comprises a fully-exposing region, a partially-exposing region and a non-exposing region, a region of the photoresist corresponding to the via holes of the insulation layer is a photoresist fully-exposed region, a region of the photoresist corresponding to the first and second electrodes is a photoresist partially-exposed region, a region of the photoresist excluding the photoresist fully-exposed region and the photoresist partially-exposed region is a photoresist fully-reserved region, the fully-exposing region, the partially-exposing region and the non-exposing region of the semitransparent mask correspond to the photoresist fully-exposed region, the photoresist partially-exposed region and the photoresist fully-reserved region, respectively;
    dry etching the insulation layer to form the via holes of the insulation layer, and ashing the photoresist to remove the photoresist in the photoresist partially-exposed region;
    depositing a transparent electrode layer and peeling off a remained photoresist in the photoresist fully-reserved region, so that the transparent electrode layer in a region where the photoresist is remained is fully removed and the transparent electrode layer in a region where there is no photoresist is fully reserved so as to form the first electrode and the second electrode for touching.

4. The method of claim 2, wherein the step S2 comprises:
    depositing the insulation layer on the substrate where the patterned metal lead and the patterned metal bridge have been formed, coating photoresist on the insulation layer, exposing and developing the photoresist through the second mask which is a semitransparent mask, wherein the semitransparent mask comprises a fully-exposing region, a partially-exposing region and a non-exposing region, a region of the photoresist corresponding to the via holes of the insulation layer is a photoresist fully-exposed region, a region of the photoresist corresponding to the first and second electrodes is a photoresist partially-exposed region, a region of the photoresist excluding the photoresist fully-exposed region and the photoresist partially-exposed region is a photoresist fully-reserved region, the fully-exposing region, the partially-exposing region and the non-exposing region of the semitransparent mask correspond to the photoresist fully-exposed region, the photoresist partially-exposed region and the photoresist fully-reserved region, respectively;
    dry etching the insulation layer to form the via holes of the insulation layer, and ashing the photoresist to remove the photoresist in the photoresist partially-exposed region;
    depositing a transparent electrode layer and peeling off a remained photoresist in the photoresist fully-reserved region, so that the transparent electrode layer in a region where the photoresist is remained is fully removed and the transparent electrode layer in a region where there is no photoresist is fully reserved so as to form the first electrode and the second electrode for touching.

5. The method of claim 1, further comprising:
    forming a protective layer on the first and second electrodes after the step S2.

6. The method of claim 2, further comprising:
    forming a protective layer on the first and second electrodes after the step S2.

7. The method of claim 5, wherein the protective layer is formed of $SiNO_x$ film.

8. The method of claim 6, wherein the protective layer is formed of $SiNO_x$ film.

* * * * *